(12) United States Patent
Xiao et al.

(10) Patent No.: US 9,672,500 B2
(45) Date of Patent: Jun. 6, 2017

(54) SELF-SERVICE TERMINAL SERVICE EMERGENCY METHOD AND SITE SERVER

(71) Applicant: GRG Banking Equipment Co., Ltd., Guangzhou, Guangdong (CN)

(72) Inventors: Dahai Xiao, Guangdong (CN); Qinghua Wang, Guangdong (CN); Haiyang Li, Guangdong (CN); Wenjiu Long, Guangdong (CN); Fei Xiong, Guangdong (CN); Zhuming Xiao, Guangdong (CN)

(73) Assignee: GRG BANKING EQUIPMENT CO., LTD., Guangzhou, Guangdong (CN)

( * ) Notice: Subject to any disclaimer, the term of this patent is extended or adjusted under 35 U.S.C. 154(b) by 0 days.

(21) Appl. No.: 15/123,674

(22) PCT Filed: Oct. 22, 2014

(86) PCT No.: PCT/CN2014/089116
§ 371 (c)(1),
(2) Date: Sep. 5, 2016

(87) PCT Pub. No.: WO2015/135322
PCT Pub. Date: Sep. 17, 2015

(65) Prior Publication Data
US 2017/0011371 A1 Jan. 12, 2017

(30) Foreign Application Priority Data
Mar. 14, 2014 (CN) .......................... 2014 1 0097961

(51) Int. Cl.
*G06Q 40/00* (2012.01)
*G07D 11/00* (2006.01)
(Continued)

(52) U.S. Cl.
CPC ......... *G06Q 20/1085* (2013.01); *G06Q 20/18* (2013.01); *G07F 19/206* (2013.01);
(Continued)

(58) Field of Classification Search
CPC ........ G06Q 40/00; G06Q 30/00; G07D 11/00; G07F 19/00; G06F 17/00
(Continued)

(56) References Cited

U.S. PATENT DOCUMENTS

2007/0101336 A1 5/2007 Moore et al.
2007/0127691 A1* 6/2007 Lert, Jr. ................. G06Q 30/02
379/265.05

(Continued)

FOREIGN PATENT DOCUMENTS

CN 1624646 A 6/2005
CN 1905433 A 1/2007
(Continued)

OTHER PUBLICATIONS

International Search Report for PCT/CN2014/089116, mailed Feb. 4, 2015, ISA/CN.
(Continued)

*Primary Examiner* — Edwyn Labaze
(74) *Attorney, Agent, or Firm* — Yue Xu; U.S. Fairsky LLP (57) ABSTRACT

A self-service terminal service contingency method and a site server are provided. The method includes: acquiring self-service services corresponding to a self-service terminal under a self-service site; detecting whether a service is lacked among the self-service services, and if yes, acquiring resources and/or components required by the lacked service, of the self-service terminal; detecting whether the self-service site has the resources and/or components required by the lacked service, of the self-service terminal, and if yes, (Continued)

integrating the resources and/or the components under the self-service network according to a preset combination rule; and driving the integrated resources and/or the components to cooperate with each other according to a preset optimization rule, so as to enable the self-service site to provide a self-service service corresponding to the lacked service.

10 Claims, 4 Drawing Sheets

(51) Int. Cl.
*G07F 19/00* (2006.01)
*G06Q 20/10* (2012.01)
*H04L 29/08* (2006.01)
*H04L 12/24* (2006.01)
*H04L 12/26* (2006.01)
*G06Q 20/18* (2012.01)

(52) U.S. Cl.
CPC ........ *G07F 19/209* (2013.01); *H04L 41/0654* (2013.01); *H04L 41/0893* (2013.01); *H04L 41/5054* (2013.01); *H04L 41/5058* (2013.01); *H04L 43/0817* (2013.01); *H04L 67/00* (2013.01); *H04L 41/5096* (2013.01)

(58) Field of Classification Search
USPC .......................... 235/379, 375; 705/14.37, 43
See application file for complete search history.

(56) References Cited

U.S. PATENT DOCUMENTS

| | | | |
|---|---|---|---|
| 2011/0106883 A1* | 5/2011 | Gupta | G06F 9/5072 709/203 |
| 2011/0208349 A1 | 8/2011 | Concannon et al. | |
| 2016/0134472 A1 | 5/2016 | Guan et al. | |
| 2016/0373944 A1* | 12/2016 | Jain | H04W 24/02 |

FOREIGN PATENT DOCUMENTS

| | | |
|---|---|---|
| CN | 1960287 A | 5/2007 |
| CN | 101610557 A | 12/2009 |
| CN | 102521006 A | 6/2012 |
| CN | 102841814 A | 7/2012 |
| CN | 102685195 A | 9/2012 |
| CN | 103106748 A | 5/2013 |
| CN | 103491129 A | 1/2014 |
| CN | 103870991 A | 6/2014 |
| EP | 1538523 A2 | 6/2005 |
| EP | 2197167 A1 | 6/2010 |
| EP | 3002907 A1 | 4/2016 |
| WO | 2012143040 A1 | 10/2012 |

OTHER PUBLICATIONS

Zang, Tianning et al. A Model of Network Device Coodinative Run, Feb. 28, 2011(Feb. 28, 2011), pp. 216 to 228.
IP Australia Examination report No. 1 for standard patent application 2014386505, mailed Feb. 15, 2017.
European Search Report for 14885502.6, mailed Feb. 20, 2017.
Summary of the Chinese 2nd Office Action for CN201410097961.9, mailed Feb. 21, 2017.

* cited by examiner

SELF-SERVICE TERMINAL SERVICE EMERGENCY METHOD AND SITE SERVER

This application is the US national phase of International Applications No.PCT/CN2014/089116 filed on Oct. 22, 2014, which claims the priority to Chinese Patent Application No. 201410097961.9, entitled "SELF-SERVICE TERMINAL SERVICE EMERGENCY METHOD AND SITE SERVER" and filed with the Chinese State Intellectual Property Office on Mar. 14, 2014, which are incorporated herein by reference in their entireties.

FIELD

The disclosure relates to the technical field of financial self-service equipment, and particularly to a self-service terminal service contingency method and a site server.

BACKGROUND

With the rapid development of society and economy, transactions between merchants and consumers are becoming increasingly popular. In such circumstances, self-service terminals (such as ATMs, i.e. automatic teller machines) are favored by consumers for their convenient and rapid 24-hour self-service banking and wide distribution.

There are four types of self-service terminal presently in use, which include an automatic teller machine, an automatic deposit machine, a cash recycling machine, and a cash recycling system, where the automated teller machine may provide a cash withdraw with card service, a cash withdraw without card service, a password modification service, a count inquiry service, a payment service, and a transfer service; the automatic deposit machine may provide a cash deposit with card service, a cash deposit without card service, a password modification service, a count inquiry services a payment service, and a transfer service; the cash recycling system may provide a cash withdraw with card service, a cash withdraw without card service, a cash deposit with card service, a cash deposit without card service, a password modification service, a count inquiry service, a payment service, and a transfer service; and the cash recycling machine may provide a cash withdraw with card service, a cash withdraw without card service, a cash deposit with card service, a cash deposit without card service, a password modification service, a count inquiry service, a payment service, and a transfer service. These self-service terminals may provide a client with the cash withdraw with card service, the cash withdraw without card service, the cash deposit with card service, the cash deposit without card service, the password modification service, the count inquiry service, the payment service, and the transfer service.

However, in a case that a core component of the self-service terminal such as a machine core, a card reader, a keyboard, or a receipt printer is malfunctioning, a self-service service on the self-service terminal associated with the malfunctioning component can not be performed. As an example, in a case that a keyboard of a cash recycling system is malfunctioning, the cash recycling system can not provide the clients with any self-service service which requires a password or numbers to be inputted. As another example, in a case that a card reader of an automatic teller machine is malfunctioning, services associated with a card can not be performed. However, most of the services performed on the automatic teller machine are cash withdraw services with card, banknotes in the machine can not be used thereby resulting in a waste of resources. As another example, in a self-service site consisting of three automatic teller machines, in a case that the card reader of one of the automatic teller machine is malfunctioning, and the keyboard of another automatic teller machine is malfunctioning, when a third automatic teller machine is run out of banknotes, banknotes in the other two automatic teller machines can not be used although banknote boxes of these two automatic teller machines are in almost full states, thus the entire self-service site can not provide the cash withdraw service to the customer. For a self-service site in a remote area, this situation is especially noticeable, since self-service terminals can not be maintained by maintenance personnel in time, the self-service site can not provide services to the customer for a long time thereby reducing the quality of services of the self-service site.

Therefore, a method for integrating resources in a self-service site is needed to solve the problem that malfunctioning components of the self-service terminal in the self-service site may result in lacked self-service services.

SUMMARY

A self-service terminal service contingency method and a site server are provided according to the embodiments of the disclosure in order to solve the problem that malfunctioning components of the self-service terminal in the self-service site may result in lacked self-service services thereby enhancing the quality of services and resource utilization of the self-service site.

A self-service terminal service contingency method is provided according to the embodiments of the disclosure, which includes:

acquiring, by a site server, self-service services corresponding to a self-service terminal in a self-service site;

detecting, by the site server, whether the self-service services include a lacked service, and acquiring, by the site sever, resources and/or components of a self-service terminal required for the lacked service in a case that the self-service services include a lacked service;

detecting, by the site server, whether the self-service site possesses the resource and/or components of the self-service terminal required for the lacked service, and integrating, by the site server, resources and/or components in the self-service site according to a predetermined integration rule in a case that the self-service site possesses the resources and/or components of the self-service terminal required for the lacked service; and driving, by the site server, the integrated resources and/or components to cooperate with each other according to a predetermined optimization rule to enable the self-service site to provide a self-service service corresponding to the lacked service.

Optionally, the integrating, by the site server, resources and/or components in the self-service site according to the predetermined integration rule may include:

selecting, by the site server, at least two self-service terminals in the self-service site according to the predetermined integration rule, where each of the at least two self-service terminals includes the resource and/or component of the self-service terminal required for the lacked service; and establishing, by the site server, a communication connection between the at least two self-service terminals.

Optionally, the integrating, by the site server, resources and/or components in the self-service site according to the predetermined integration rule may include:

integrating, by the site server, the resources and/or components in the self-service site according to a first integration rule, a second integration rule or a third integration rule, where a priority of the first integration rule is higher than a priority of the second integration rule, and a priority of the second integration rule is higher than a priority of the third integration rule, where according to the first integration rule, the resources and/or components provided by less self-service terminals are preferably selected as the resources and/or components in the self-service site to be integrated by the site sever, where the number of the self-service terminals is at least 2;

according to the second integration rule, the resources and/or components provided by idle self-service terminals are preferably selected as the resources and/or components in the self-service site to be integrated by the site sever; and according to the third integration rule, the resources and/or components provided by self-service terminals which are located geographically close to each other are preferably selected as the resources and/or components in the self-service site to be integrated by the site sever.

Optionally, the driving, by the site server, the integrated resources and/or components to cooperate with each other according to the predetermined optimization rule may include:

determining, by the site server, several self-service terminals including the integrated resources and/or components;

authenticating, by the site server, the several determined self-service terminals according to the predetermined optimization rule; and performing, by the site server, service operations between the several self-service terminals following a service procedure of the lacked service according to the predetermined optimization rule.

Optionally, according to the predetermined optimization rule, the service terminal among the several service terminals which provides a largest number of resources and/or components is defined as a master terminal, and the rest of the several service terminals are defined as slave terminals, where the site server preferably allocates a part of a service procedure associated with the lacked service to the master terminal, and allocates the rest of the service procedure to the slave terminals.

A site server is included according to the embodiments of the disclosure, which includes:

a service acquirement module configured to acquire self-service services corresponding to a self-service terminal in a self-service site;

a service detection module configured to detect whether the self-service services include a lacked service, and transmit a first trigger signal to a resource acquirement module in a case that the self-service services include a lacked service;

the resource acquirement module is configured to learn resources and/or components of a self-service terminal required for the lacked service on reception of the first trigger signal from the service check module;

a resource detection module configured to detect whether the self-service site possesses the resources and/or components of the self-service terminal required for the lacked service, and transmit a second trigger signal to a resource integration module in a case that the self-service site possesses the resources and/or components of the self-service terminal required for the lacked service;

the resource integration module configured to integrate resources and/or components in the self-service site according to a predetermined integration rule on reception of the second trigger signal from the resource check module; and a cooperation module configured to drive the integrated resources and/or components to cooperate with each other according to a predetermined optimization rule to enable the self-service site to provide a self-service service corresponding to the lacked service.

Optionally, the resource integration module may include:

a terminal acquirement unit configured to select at least two self-service terminals in the self-service site according to the predetermined integration rule, where each of the at least two self-service terminals includes the resource and/or component of the self-service terminal required for the lacked service; and a communication connection unit configured to establish a communication connection between the at least two self-service terminals.

Optionally, the resource integration module may further include:

an integration rule unit configured to bear the predetermined integration rule, where the integration rule unit includes a first integration rule sub-unit, a second integration rule sub-unit and a third integration rule sub-unit, a priority of the first integration rule sub-unit is higher than a priority of the second integration rule sub-unit, and a priority of the second integration rule sub-unit is higher than a priority of the third integration rule sub-unit, where the first integration rule sub-unit is configured to specify that resources and/or components provided by less self-service terminals are preferably selected as the resources and/or components in the self-service site to be integrated by the resource integration module, where the number of the self-service terminals is at least 2;

the second integration rule sub-unit is configured to specify that resources and/or components provided by idle self-service terminals are preferably selected as the resources and/or components in the self-service site to be integrated by the resource integration module; and the third integration rule sub-unit is configured to specify that resources and/or components provided by self-service terminals which are located geographically close to each other are preferably selected as the resources and/or components in the self-service site to be integrated by the resource integration module.

Optionally, the cooperative operation module may include:

a terminal determination unit configured to determine several self-service terminals including the integrated resources and/or components;

an authentication unit configured to authenticate the several determined self-service terminals according to a predetermined optimization rule; and a service operation unit configured to perform service operations between the several self-service terminals following a service procedure of the lacked service according to the predetermined optimization rule.

Optionally, the cooperation module may further include:
a optimization rule unit configured to carry the predetermined optimization rule, where
according to the predetermined optimization rule, a service terminal of the several service terminals which provides a largest number of resources and/or components is defined as a master terminal, and the rest of the several service terminals are defined as slave terminals, where the service operation unit preferably allocates a part of the service procedure associated with the lacked service to the master terminal, and allocates the rest of the service procedure to the slave terminals.

As can be seen from the above technical solutions, embodiments of the disclosure may have the following advantages.

According to the embodiments of the disclosure, a site server acquires self-service services corresponding to a self-service terminal in a self-service site; the site server detects whether the self-service services include a lacked service, and acquire resources and/or components of a self-service terminal required for the lacked service in a case that the self-service services include a lacked service; the site server detects whether the self-service site possesses the resources and/or components of the self-service terminal required for the lacked service, and integrates the resources and/or components in the self-service site according to a predetermined integration rule in a case that the self-service site possesses the resources and/or components of the self-service terminal required for the lacked service; and the site server drive the integrated resources and/or components to cooperate with each other according to a predetermined optimization rule to enable the self-service site to provide a self-service service corresponding to the lacked service. In the embodiments of the disclosure, in a case that a lacked service exists in the self-service site, the site server may integrate the resources and/or components and drive them to cooperate with each other in the self-service site thus the self-service site may provide a self-service service corresponding to the lacked service thereby solving the problem that malfunctioning components of the self-service terminal in the self-service site may result in lacked self-service services and enhancing the quality of services and resource utilization of the self-service site.

BRIEF DESCRIPTION OF THE DRAWINGS

In order to illustrate the technical solutions according to the embodiments of the present disclosure or in the conventional art more clearly, drawings to be used in the description of the conventional art or the embodiments will be described briefly hereinafter. Apparently, the drawings described hereinafter are only some embodiments of the present disclosure, and other drawings may be obtained by those skilled in the art according to those drawings without creative labor.

DETAILED DESCRIPTION OF THE EMBODIMENTS

A self-service terminal service contingency method and a site server are provided according to the embodiments of the disclosure in order to solve the problem that malfunctioning components of a self-service terminal in a self-service site may result in lacked self-service services, thereby enhancing the quality of services and resource utilization of the self-service site.

To illustrate the objects, features and advantages of the present disclosure more clearly, the technical solutions in the embodiments of the present disclosure will be described clearly and completely hereinafter in conjunction with the drawings in the embodiments of the present disclosure. Apparently, the described embodiments are only some but not all of the embodiments of the present disclosure. All the other embodiments obtained by those ordinary skilled in the art based on the embodiments of the present disclosure without creative effort fall within the scope of protection of the present disclosure.

Figure 1:
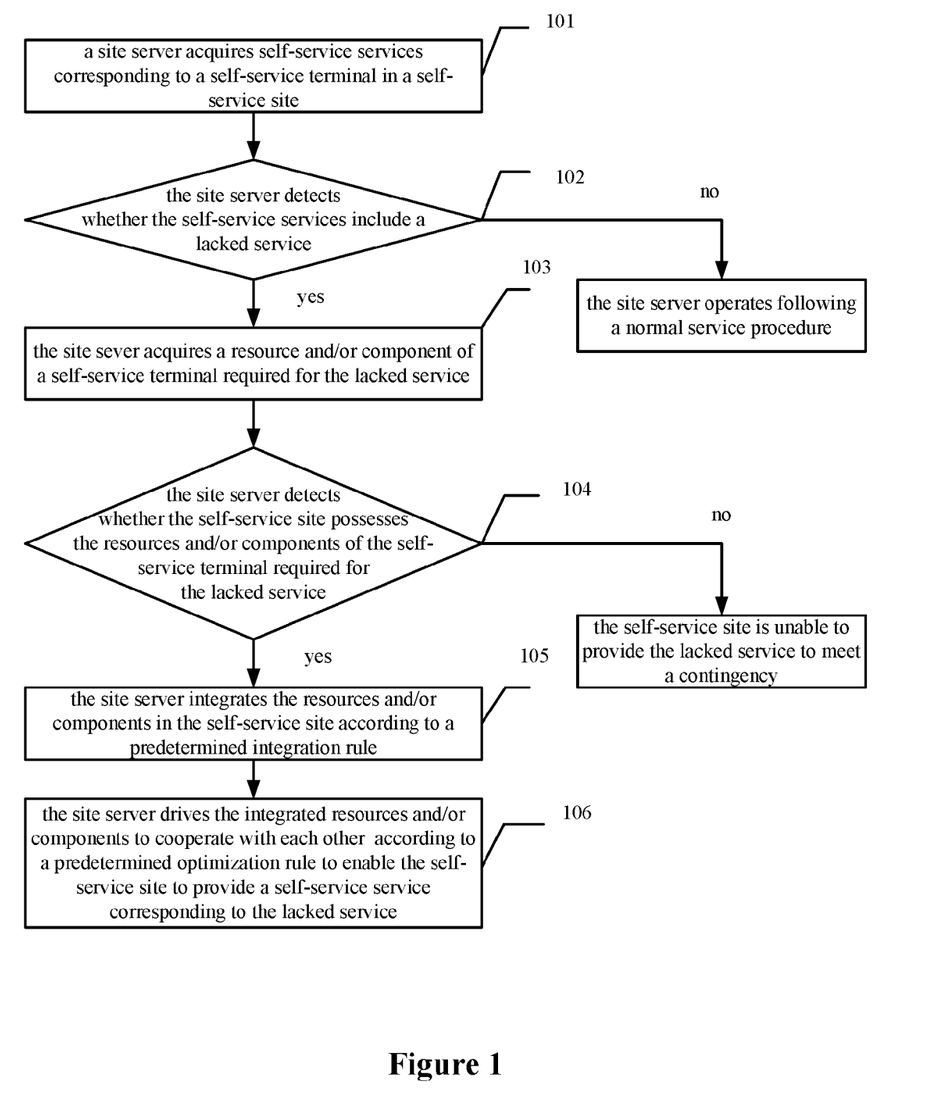
FIG. 1 is a flow chart of a self-service terminal service contingency method according to an embodiment of the disclosure.

Referring to FIG. 1, a self-service terminal service contingency method according to an embodiment of the disclosure includes the following steps 101 to 106.

In step 101, a site server acquires self-service services corresponding to a self-service terminal in a self-service site.

The site server may acquire the self-service services corresponding to the self-service terminal in the self-service site. It should be understood that, the site server may acquire the self-service services corresponding to the self-service terminal in the self-service site when the self-service site starts operation. Alternatively, the site server may acquire the self-service corresponding to the self-server terminal in the self-service site when all of the services of the self-service terminals in the self-service site can be provided properly, thus the site server can be aware of all the self-service services that may be provided in a case that all the self-service terminals in the self-service site operate properly.

In step 102, the site server detects whether the self-service services include a lacked service; step 103 is executed in a case that the self-service services include a lacked service.

After the self-service services corresponding to the self-service terminal in the self-service site are acquired, the site server may detect whether the self-service services include a lacked service; step 103 is executed in a case that the self-service services include a lacked service; or else, the site server operates following a normal service procedure. The lacked service may be a service which should be provided but can not be provided at present by the self-service site because some resources or components of the self-service terminal in the self-service site are malfunctioning.

In step 103, the site sever acquires resources and/or components of a self-service terminal required for the lacked service.

The site server may acquire the resources and/or components of the self-service terminal required for the lacked service on determining that the self-service services include a lacked service.

In step 104, the site server detects whether the self-service site possesses the resources and/or components of the self-service terminal required for the lacked service; step 105 is executed in a case that the self-service site possesses the resources and/or components of the self-service terminal required for the lacked service.

The site server may detect whether the self-service site possesses the resources and/or components of the self-service terminal required for the lacked service after the resources and/or components of the self-service terminal required for the lacked service are acquired by the site server; step 105 is executed in a case that the self-service site possesses the resources and/or components of the self-service terminal required for the lacked service; or else, the self-service site is unable to provide the lacked service to meet a contingency.

In step 105, the site server integrates the resources and/or components in the self-service site according to a predetermined integration rule.

The site server may integrate the resources and/or components in the self-service site according to a predetermined integration rule on determining that the self-service site possesses the resources and/or components of the self-service terminal required for the lacked service.

In step 106, the site server drives the integrated resources and/or components to cooperate with each other according to a predetermined optimization rule to enable the self-service site to provide a self-service service corresponding to the lacked service.

The site server may drive the integrated resources and/or components to cooperate with each other according to a predetermined optimization rule to enable the self-service site to provide the self-service service corresponding to the lacked service after the resources and/or components in the self-service site is integrated by the site server according to the predetermined integration rule.

In this embodiment, the above self-service terminal service contingency method includes the following steps. A site server acquires self-service services corresponding to a self-service terminal in a self-service site; the site server detects whether the self-service services include a lacked service, and acquires resources and/or components of a self-service terminal required for the lacked service in a case that the self-service services include a lacked service; the site server detects whether the self-service site possesses the resources and/or components of the self-service terminal required for the lacked service, and integrates the resources and/or components in the self-service site according to a predetermined integration rule in a case that the self-service site possesses the resources and/or components of the self-service terminal required for the lacked service; and the site server drives the integrated resources and/or components to cooperate with each other according to a predetermined optimization rule to enable the self-service site to provide a self-service service corresponding to the lacked service. In this embodiment, in a case that a lacked service exists in the self-service site, the site server may integrate the resources and/or components and drive them to cooperate with each other in the self-service site thus the self-service site may provide the self-service service corresponding to the lacked service thereby solving the problem that malfunctioning components of the self-service terminal in the self-service site may result in lacked self-service services and enhancing the quality of services and resource utilization of the self-service site.

Figure 2:
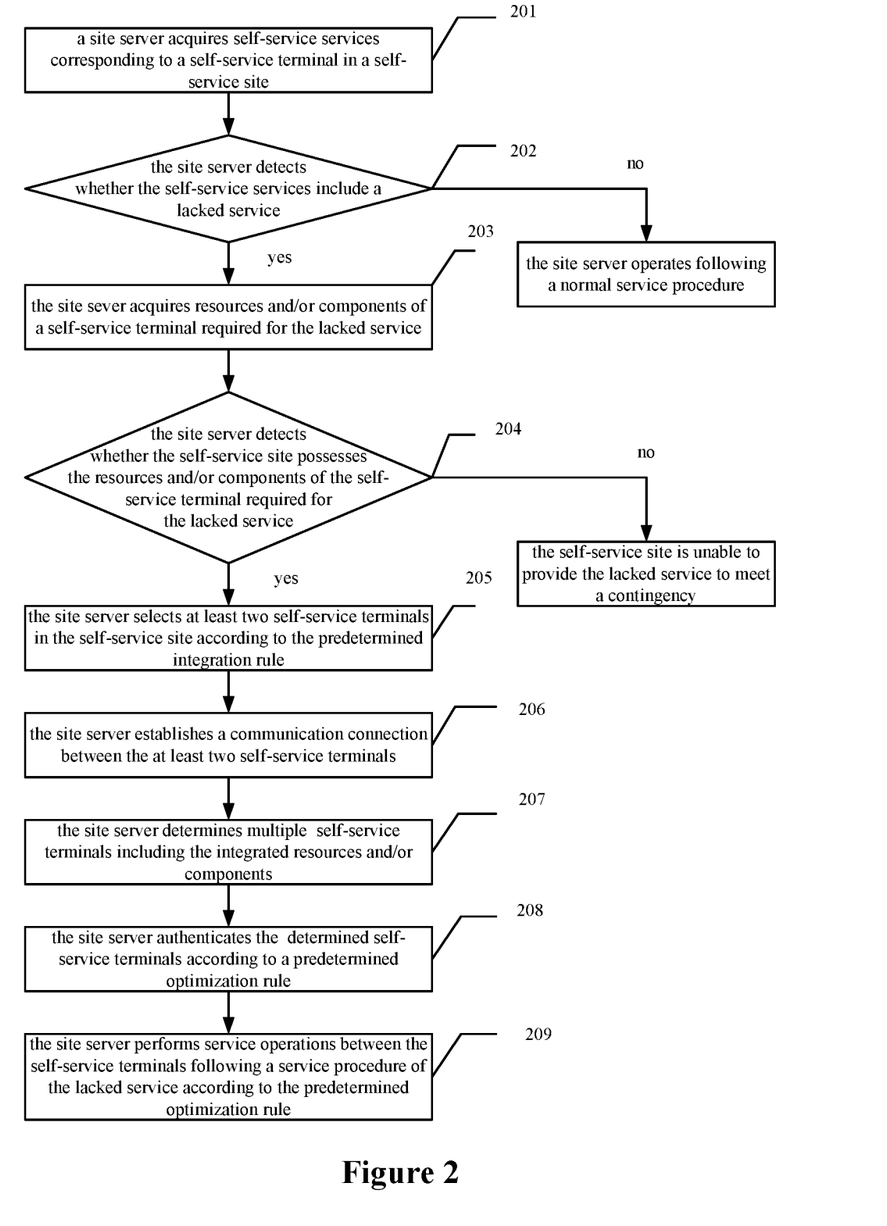
FIG. 2 is a flow chart of a self-service terminal service contingency method according to another embodiment of the disclosure.

To facilitate understanding, the self-service terminal service contingency method according to the embodiments of the disclosure is described in detail in the following. Referring to FIG. 2, a self-service terminal service contingency method according to anther embodiment includes the following steps 201 to 209.

In step 201, a site server acquires self-service services corresponding to a self-service terminal in a self-service site.

The site server may acquire the self-service services corresponding to the self-service terminal in the self-service site. It should be understood that, the site server may acquire the self-service services corresponding to the self-service terminal in the self-service site when the self-service site starts operation. Alternatively, the site server may acquire the self-services corresponding to the self-service terminal in the self-service site when all of the services of the self-service terminals in the self-service site can be provided properly, thus the site server can be aware of all the self-service services that may be provided in a case that all the self-service terminals in the self-service site operate properly.

It should be noted that, the site server may be a merchant bank front end, a self-service terminal in the self-service site, or a standalone server in the self-service site. With respect to the description that the self-service terminals operate properly, it is indicated that all of the resources in the self-service terminals are sufficient, or the amount of banknotes, receipt paper, journal paper are sufficient to meet the requirement of self-services. In addition, it is also indicated that each of the components of the self-service terminal such as a self-service terminal machine core, a keyboard, a journal printing module, a receipt printer, a card reader, a back end terminal, a sensor and other components which facilitate proper operation of the self-service terminal are in n normal operating conditions.

In step 202, the site server detects whether the self-service services include a lacked service; step 103 is executed in a case that the self-service services include a lacked service; or else, the site server operates following a normal service procedure.

After self-service services corresponding to the self-service terminal in the self-service site are acquired, the site server may detect whether the self-service services include a lacked service; step 103 is executed in a case that the self-service services include a lacked service; or else, the site server operates following a normal service procedure. The lacked service may be a service which should be provided but can not be provided at present by the self-service site because some resources or components of the self-service terminal in the self-service site are malfunctioning. It should be understood that, in a case that the self-service services include a lacked service, it is indicated that there necessarily exist situations where a resource of the self-service terminal is insufficient or a component of the self-service terminal is malfunctioning. In this case, it is understood that resources and/or components in the self-service site are required to be integrated to restore the lacked service.

It should be noted that, the site server may acquire self-service services that can be provided by each of the self-service terminals in the self-service site in a real time manner and voluntarily query a current service type on each of the self-service terminals. In addition, in a case that a component of a self-service terminal is malfunctioning or a resource shortage occurs in the self-service terminal at some point, which result in a self-service service being stopped, this situation is reported to the server without delay. The stopped self-service service is the lacked service. For example, if a card reader of a cash recycling system is malfunctioning, the site server may acquire all of the self-service services that can be provided by the self-service site at that point, which include a cash withdraw with card service, a cash withdraw without card service, a cash deposit without card service, a password modification service, a count inquiry service, a payment service, and a transfer service. However, a cash deposit with card service can not be provided because of malfunctioning of the card reader of the cash recycling system, thus the lacked service in the self-service site is the cash deposit with card service.

In step 203, the site sever acquires resources and/or components of a self-service terminal required for the lacked service.

The site server may acquire the resources and/or components of the self-service terminal required for the lacked service on determining that the self-service services include the lacked service. It should be understood that, since the lacked service is one of the self-service services, and normal execution of a self-service service requires resources and/or components provided by the self-service terminal in the self-service site, therefore, normal execution of the lacked service also requires its corresponding resource and/or component.

In step 204, the site server detects whether the self-service site possesses the resources and/or components of the self-service terminal required for the lacked service; step 105 is executed in a case that the self-service site possesses the resources and/or components of the self-service terminal required for the lacked service; or else, the self-service site is unable to provide the lacked service to meet a contingency.

The site server may detect whether the self-service site possesses the resources and/or components of the self-service terminal required for the lacked service after the resources and/or components of the self-service terminal required for the lacked service is acquired by the site server; step 105 is executed in a case that the self-service site possesses the resources and/or components of the self-service terminal required for the lacked service; or else, the self-service site is unable to provide the lacked service to meet a contingency. It should be understood that, the site server needs to be aware of whether the self-service site possesses the resources and/or components of the self-service terminal required for the lacked service thereby being able to perform corresponding contingency processing steps to restore the lacked service.

In step 205, the site server selects at least two self-service terminals in the self-service site according to the predetermined integration rule.

The site server may select at least two self-service terminals in the self-service site according to the predetermined integration rule on determining that the self-service site possesses the resource and/or component of the self-service terminal required for the lacked service, where the at least two self-service terminals include the resource and/or component of the self-service terminal required for the lacked service.

It should be noted that, the predetermined integration rule includes a first integration rule, a second integration rule and a third integration rule; where a priority of the first integration rule is higher than a priority of the second integration rule, and a priority of the second integration rule is higher than a priority of the third integration rule, where according to the first integration rule, resources and/or components provided by less self-service terminals are preferably selected as the resources and/or components in the self-service site to be integrated by the site sever, where the number of the self-service terminals is at least 2;

according to the second integration rule, resources and/or components provided by idle self-service terminals are preferably selected as the resources and/or components in the self-service site to be integrated by the site sever; and according to the third integration rule, resources and/or components provided by self-service terminals which are located geographically close to each other are preferably selected as the resources and/or components in the self-service site to be integrated by the site sever.

In step 206, the site server establishes a communication connection between the at least two self-service terminals.

The site server may establish a communication connection between the at least two self-service terminals after the at least two self-service terminals in the self-service site are selected by the site server according to the predetermined integration rule. It should be understood that, the site server may function as an intermediate communication device between the at least two self-service terminals for forwarding communication information and singling messages, or may not participate in the communication between the at least two self-service terminals when the communication connection between the at least two self-service is established, which is not limited herein.

In step 207, the site server determines multiple self-service terminals including the integrated resources and/or components.

The site server may determine multiple self-service terminals including the integrated resources and/or components, thus the site server may allocate a service procedure to or perform a service procedure on the several self-service terminals including the resources and/or components based on the resources and/or components.

In step 208, the site server authenticates the several determined self-service terminals according to a predetermined optimization rule.

The site server may authenticate the several determined self-service terminals according to the predetermined optimization rule to ensure the legitimacy of the client on the several self-service terminals thereby avoiding a faulty operation between different clients. Meanwhile, security of the self-service service of the client may also be ensured.

In step 209, the site server performs service operations between the self-service terminals following a service procedure of the lacked service according to the predetermined optimization rule.

The site server may perform service operations between the self-service terminals following the service procedure of the lacked service according to the predetermined optimization rule after authenticating the several determined self-service terminals according to the predetermined optimization rule thereby enabling the self-service site to provide the self-service service corresponding to the lacked service.

It should be noted that, according to the predetermined optimization rule, a service terminal of the several service terminals which provides a largest number of resources and/or components is defined as a master terminal, and the rest of the service terminals is defined as a slave terminal. The site server preferably allocates a part of the service procedure associated with the lacked service to the master terminal, and allocates the rest of the service procedure to the slave terminal. For example, according to the optimization rule, in a contingency scheme including a self-service terminal which has a malfunctioning card reader and has normal dispensing and inputting functions and a self-service terminal which has a normal functioning card reader but can not provide the dispensing function, the self-service terminal which has a malfunctioning card reader and has normal dispensing and inputting functions may be defined as the master terminal, and the self-service terminal which has a normal functioning card reader but can not provide the dispensing function is defined as the slave terminal, where most of the service procedure may be performed on the master terminal and one step of the service procedure may be performed on the slave terminal.

In this embodiment, the above self-service terminal service contingency method includes the following steps. A site server acquires self-service services corresponding to a self-service terminal in a self-service site; the site server detects whether the self-service services include a lacked service, and acquires resources and/or components of a self-service terminal required for the lacked service in a case that the self-service services include a lacked service; the site server detects whether the self-service site possesses the resources and/or components of the self-service terminal required for the lacked service, and integrates the resources and/or components in the self-service site according to a predetermined integration rule in a case that the self-service site possesses the resources and/or components of the self-service terminal required for the lacked service; and the site server drives the integrated resources and/or components to cooperate with each other according to a predetermined optimization rule to enable the self-service site to provide a self-service service corresponding to the lacked service. In this embodiment, in a case that a lacked service exists in the self-service site, the site server may integrate and cooperatively operates resources and/or components in the self-service site thus the self-service site may provide a self-service service corresponding to the lacked service thereby solving the problem that malfunctioning components of the self-service terminal in the self-service site may result in lacked self-service services and enhancing the quality of services and resource utilization of the self-service site. Further, the site server may authenticate the several determined self-service terminals according to the predetermined optimization rule to ensure the legitimacy of the client on the several self-service terminals thereby avoiding a faulty operation between different clients. Meanwhile, security of the self-service service of the client may also be ensured.

To facilitate understanding, based on the embodiment described in conjunction with FIG. 2, the self-service terminal service contingency method according to the embodiments of the disclosure is described in an application scenario.

It is supposed that a self-service site includes one automatic teller machine, one automatic deposit machine and one cash recycling system. The automatic teller machine may provide a cash withdraw with card service, a cash withdraw without card service, a password modification service, a count inquiry service, a payment service, and a transfer service; the automatic deposit machine may provide a cash deposit with card service, a cash deposit without card service, a password modification service, a count inquiry services a payment service, and a transfer service; the cash recycling system may provide a cash withdraw with card service, a cash withdraw without card service, a cash deposit with card service, a cash deposit without card service, a password modification service, a count inquiry service, a payment service, and a transfer service. Therefore, the self-service site may provide a client with the cash withdraw with card service, the cash withdraw without card service, the cash deposit with card service, the cash deposit without card service, the password modification service, the count inquiry service, the payment service, and the transfer service.

When the self-service site operated over a period of time, a keyboard of the automatic deposit machine is malfunctioning and can not be used, and the automatic deposit machine can not provide any service. However, self-service services of this self-service site is not affected, the self-service site can still provide the cash withdraw with card service, the cash withdraw without card service, the cash deposit with card service, the cash deposit without card service, the password modification service, the count inquiry service, the payment service, and the transfer service.

It is supposed that a card reader of the cash recycling system is malfunctioning, the cash withdraw with card service and the cash deposit with card service of the cash recycling system can not be provided. Therefore, the self-service site can still provide the client with the cash withdraw with card service, the cash withdraw without card service, the cash deposit without card service, the password modification service, the count inquiry service, the payment service, and the transfer service; and can not provide the cash deposit with card service.

In this case, a site server of this self-service employs the self-service terminal service contingency method. The site server detects self-services of the self-service site and determines the lacked service of this self-service site is the cash deposit with card service.

The site server acquires the resources and components required for the cash deposit with card service are a machine core, a keyboard, a receipt printer, a card reader, receipt paper and the like.

The site server detects the resources and components processed by the self-service site and is aware that the cash recycling system has the machine core, the keyboard, the receipt printer and the receipt paper, and each of the automatic teller machine and the automatic deposit machine has the card reader which operates properly.

The site server selects the cash recycling system and the automatic deposit machine as self-service terminals providing the integrated resources and/or components according to the predetermined integration rule, and establishes a communication connection between the cash recycling system and the automatic deposit machine.

Then the site server requires the client to provide identification through the cash recycling system and the automatic deposit machine. The client needs to insert a bankcard into the automatic deposit machine and then input a password of the bankcard on cash recycling system. The service procedure of the cash deposit with card service is performed only when the client is authenticated.

After authenticating the client who performs operations on the cash recycling system and the automatic deposit machine, the site server allocates the service procedure of the cash deposit with card service to the cash recycling system and the automatic deposit machine according to a predetermined optimization rule. It will be understood that, since only the card reader of the cash recycling system is malfunctioning, other components and resources of the cash recycling system are in normal conditions, the site server allocates the service procedure associated with card insertion to the automatic deposit machine, and allocates the rest of the procedure to the cash recycling system. Operations performed by the client in the self-server site may include the following steps A to I.

In step A, the client inserts the bankcard into the automatic deposit machine, a screen of the automatic deposit machine displays a prompt "Please move to the cash recycling system and input a password of the bankcard".

In step B, the client inputs the password of the bankcard into the cash recycling system and the client is authenticated.

In step C, the client selects "English" for language.

In step D, the client selects "deposit" for service type.

In step E, the client puts banknotes into the cash recycling system and selects "confirm"; the cash recycling system starts counting the banknotes and displays the amount to be deposited on the screen.

In step F, the client submits deposits after confirming that the amount is correct.

In step G, the cash recycling system prompts the user whether to print a receipt. After confirmation of the client, the cash recycling system prints the receipt of the current service. The client obtains the receipt.

In step H, the client selects "withdraw card" on the cash recycling system. The screen of the cash recycling system displays a prompt "Please move to the automatic deposit machine and take care of your card".

In step I, the client moves to the automatic deposit machine and take the card. The self-service service ends.

Figure 3:
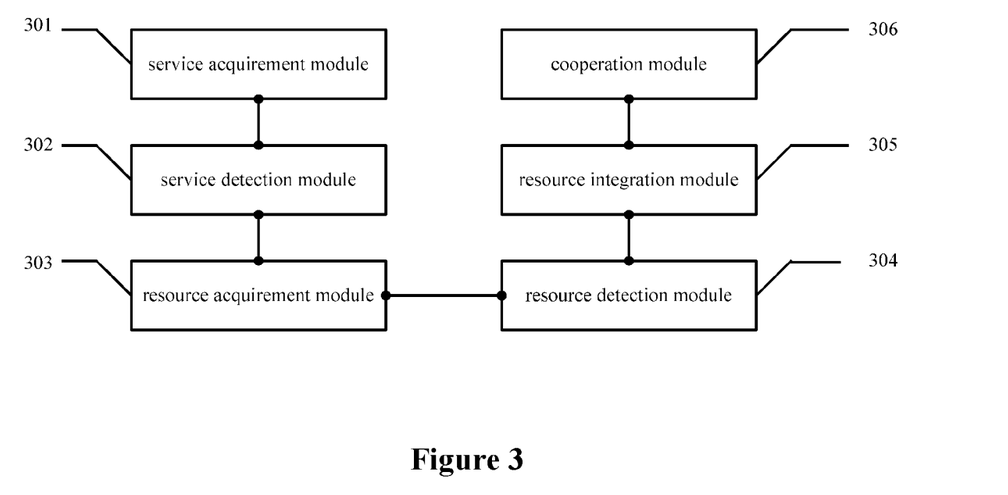
FIG. 3 is a schematic structural diagram of a site server according to an embodiment of the disclosure.

The self-service terminal service contingency method is described in detail in the above. Hereinafter, a site server will be described in detail. Referring to FIG. 3, a site server according to an embodiment of the disclosure includes:

a service acquirement module 301 configured to acquire self-service services corresponding to a self-service terminal in a self-service site;

a service detection module 302 configured to detect whether the self-service services include a lacked service, and transmit a first trigger signal to a resource acquirement module 303 in a case that the self-service services include a lacked service;

the resource acquirement module 303 configured to acquire resources and/or components of a self-service terminal required for the lacked service on reception of the first trigger signal from the service check module 302;

a resource check module 304 configured to detect whether the self-service site possesses the resources and/or components of the self-service terminal required for the lacked service, and transmit a second trigger signal to a resource integration module 305 in a case that the self-service site possesses the resources and/or components of the self-service terminal required for the lacked service;

the resource integration module 305 configured to integrate resources and/or components in the self-service site according to a predetermined integration rule on reception of the second trigger signal from the resource detection module 304; and a cooperation module 306 configured to drive the integrated resources and/or components to cooperate with each other according to a predetermined optimization rule to enable the self-service site to provide a self-service service corresponding to the lacked service.

In this embodiment, a service acquirement module 301 acquires self-service services corresponding to a self-service terminal in a self-service site; a service detection module 302 detects whether the self-service services include a lacked service, and a resource acquirement module 303 acquires resources and/or components of a self-service terminal required for the lacked service in a case that the self-service services include a lacked service; a resource detection module 304 detects whether the self-service site possesses the resources and/or components of the self-service terminal required for the lacked service, and a resource integration module 305 integrates the resources and/or components in the self-service site according to a predetermined integration rule in a case that the self-service site possesses the resources and/or components of the self-service terminal required for the lacked service; and a cooperation module 306 server drives the integrated resources and/or components to cooperate with each other according to a predetermined optimization rule to enable the self-service site to provide a self-service service corresponding to the lacked service. In this embodiment, in a case that a lacked service exists in the self-service site, the site server may integrate and cooperatively operates resources and/or components in the self-service site thus the self-service site may provide a self-service service corresponding to the lacked service thereby solving the problem that malfunctioning components of the self-service terminal in the self-service site may result in lacked self-service services and enhancing the quality of services and resource utilization of the self-service site.

Figure 4:
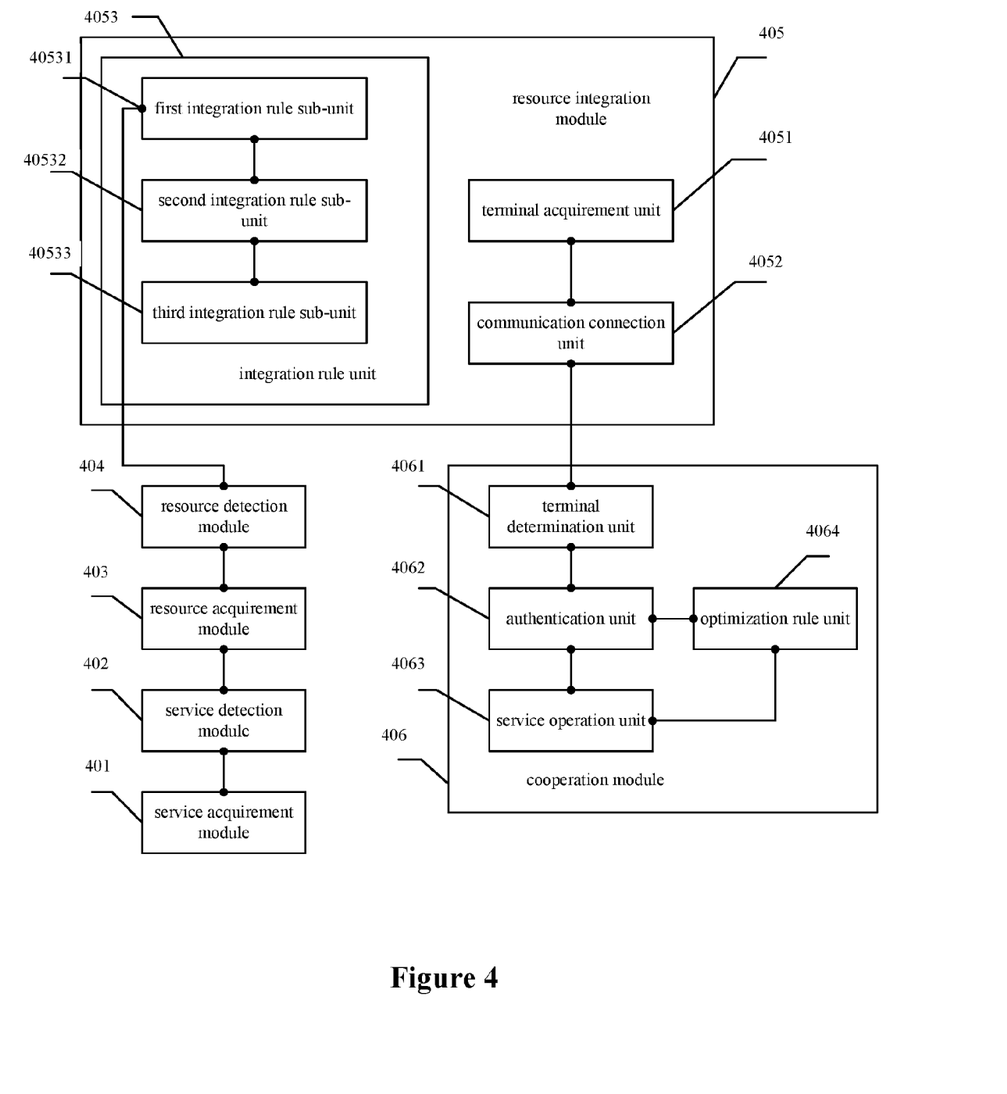
FIG. 4 is a schematic structural diagram of a site server according to another embodiment of the disclosure.

To facilitate understanding, the site server according to the embodiments of the disclosure is described in detail in the following. Referring to FIG. 4, a site server according to another embodiment of the disclosure includes:

a service acquirement module 401 configured to acquire self-service services corresponding to a self-service terminal in a self-service site;

a service diction module 402 configured to detect whether the self-service services include a lacked service, and transmit a first trigger signal to a resource acquirement module 403 in a case that the self-service services include a lacked service;

the resource acquirement module 403 is configured to acquire resources and/or components of a self-service terminal required for the lacked service on reception of the first trigger signal from the service detection module 402;

a resource detection module 404 configured to detect whether the self-service site possesses the resources and/or components of the self-service terminal required for the lacked service, and transmit a second trigger signal to a resource integration module 405 in a case that the self-service site possesses the resources and/or components of the self-service terminal required for the lacked service;

the resource integration module 405 configured to integrate the resources and/or components in the self-service site according to a predetermined integration rule on reception of the second trigger signal from the resource detection module 404; and a cooperation module 406 configured to drive the integrated resources and/or components to cooperate with each other according to a predetermined optimization rule to enable the self-service site to provide a self-service service corresponding to the lacked service.

The resource integration module 405 in this embodiment may include:

a terminal acquirement unit 4501 configured to select at least two self-service terminals in the self-service site according to the predetermined integration rule, where each of the at least two self-service terminals includes the resource and/or component of the self-service terminal required for the lacked service;

a communication connection unit 4502 configured to establish a communication connection between the at least two self-service terminals; and an integration rule unit 4503 configured to bear the predetermined integration rule.

Particularly, the integration rule unit 4503 may include:

the first integration rule sub-unit 40531 configured to specify that resources and/or components provided by less self-service terminals are preferably selected as the resources and/or components in the self-service site to be integrated by the resource integration module 405, where the number of the self-service terminals is at least 2;

the second integration rule sub-unit 40532 configured to specify that resources and/or components provided by idle self-service terminals are preferably selected as the resources and/or components in the self-service site to be integrated by the resource integration module 405; and the third integration rule sub-unit 40533 is configured to specify that resources and/or components provided by self-service terminals which are located geographically close to each other are preferably selected as the resources and/or components in the self-service site to be integrated by the resource integration module 405.

It should be noted that, a priority of the first integration rule sub-unit is higher than a priority of the second integration rule sub-unit, and a priority of the second integration rule sub-unit is higher than a priority of the third integration rule sub-unit.

Particularly, the cooperative operation module 406 in this embodiment may include:

a terminal determination unit 4061 configured to determine several self-service terminals including the integrated resources and/or components;

an authentication unit 4062 configured to authenticate the several determined self-service terminals according to a predetermined optimization rule; and a service operation unit 4063 configured to perform service operations between the several self-service terminals following a service procedure of the lacked service according to the predetermined optimization rule.

The cooperative operation module 406 in this embodiment may further include:

a optimization rule unit 4064 configured to bear the predetermined optimization rule, where according to the predetermined optimization rule, a service terminal of the several service terminals which provides a largest number of resources and/or components is defined as a master terminal, and the rest of the several service terminals are defined as slave terminals, where the service operation unit 4063 preferably allocates a part of the service procedure associated with the lacked service to the master terminal, and allocates the rest of the service procedure to the slave terminals.

It is to be known clearly by those skilled in the art that, for convenient and clear description, for specific operation processes of the above system, device and unit, reference may be made to the corresponding process in the above method embodiment, which is not described here.

In the embodiments mentioned in the disclosure, it is to be understood that, the disclosed system, device and method may be implemented in other ways. For example, the above device embodiment is only illustrative. For example, the division of the units is only a logical functional division. In practice, there may be other divisions. For example, multiple units or assembles may be combined or may be integrated into another system. Alternatively, some features may be neglected or not be performed. The displayed or discussed mutual coupling or direct coupling or communication connection may be an indirect coupling or communication connection via some interfaces, devices or units, which may be in an electrical, mechanical or other form.

The unit described as a separate component may be or may not be separate physically, and the component which is displayed as a unit may be or may not be a physical unit, that is, may be located at a position, or may be distributed over multiple network units. Some or all of the units may be selected as required to implement the solution of the embodiment.

Further, the functional units in the embodiments of the disclosure may be integrated into one processing unit, and may exist physically separately, and may be integrated into one unit by two or more. The above integrated unit may be implemented in hardware, and may also be implemented by using a software functional unit.

When being implemented by using a software functional unit and being sold and used as a separate product, the integrated unit may be stored in a computer readable storage medium. Based on this, essential part or a part contributing to the prior art of the technical solution of the disclosure or the whole or part of the technical solution may be embodied in a software product which is stored in a storage medium, including several instructions for causing a computer device (which may be a personal computer, a server, a network device or the like) to perform all or some of the steps of the method in the embodiment of the disclosure. The existing storage medium includes various mediums capable of storing program code, such as U disk, movable disk, Read-Only Memory (ROM), Random Access Memory (RAM), magnetic disk or optical disk.

As described above, the above embodiments are only intended to describe the technical solutions of the disclosure, but not to limit the scope of the disclosure. Although the disclosure is described in detail with reference to the above embodiments, it should be understood by those ordinal skilled in the art that modifications can be made to the technical solutions recorded in the above embodiments or equivalent replacements can be made to some or all of the technical features thereof, which modifications and equivalent replacements will not make the corresponding technical solutions deviate from the scope of the technical solutions of the embodiments of the disclosure.

The invention claimed is:

1. A self-service terminal service contingency method, comprising:

acquiring, by a site server, self-service services corresponding to a self-service terminal in a self-service site;

detecting, by the site server, whether the self-service services comprise a lacked service, and acquiring, by the site sever, resources and/or components of a self-service terminal required for the lacked service in a case that the self-service services comprise a lacked service;

detecting, by the site server, whether the self-service site possesses the resources and/or components of the self-service terminal required for the lacked service, and integrating, by the site server, the resources and/or components in the self-service site according to a predetermined integration rule in a case that the self-service site possesses the resources and/or components of the self-service terminal required for the lacked service; and driving, by the site server, the integrated resources and/or components to cooperate with each other according to a predetermined optimization rule to enable the self-service site to provide a self-service service corresponding to the lacked service.

2. The method according to claim 1, wherein the integrating, by the site server, resources and/or components in the self-service site according to a predetermined integration rule comprises:

selecting, by the site server, at least two self-service terminals in the self-service site according to the predetermined integration rule, wherein each of the at least two self-service terminals comprises the resources and/or components of the self-service terminal required for the lacked service; and establishing, by the site server, a communication connection between the at least two self-service terminals.

3. The method according to claim 1, wherein the integrating, by the site server, resources and/or components in the self-service site according to a predetermined integration rule comprises:

integrating, by the site server, the resources and/or components in the self-service site according to a first integration rule, a second integration rule or a third integration rule, wherein a priority of the first integration rule is higher than a priority of the second integration rule, and a priority of the second integration rule is higher than a priority of the third integration rule, wherein according to the first integration rule, an integration solution in which the resources and/or components are provided by less self-service terminals has a priority to be selected, in a process of the site server integrating the resources and/or components in the self-service site, wherein the number of the self-service terminals is at least 2;

according to the second integration rule, an integration solution in which the resources and/or components are provided by idle self-service terminals has a priority to be selected, in a process of the site server integrating the resources and/or components in the self-service site;

according to the third integration rule, an integration solution in which the resources and/or components are provided by self-service terminals which are located geographically close to each other has a priority to be selected, in a process of the site server integrating the resources and/or components in the self-service site.

4. The method according to claim 1, wherein the driving, by the site server, the integrated resources and/or components to cooperate with each other according to a predetermined optimization rule comprises:

determining, by the site server, self-service terminals comprising the integrated resources and/or components;

authenticating, by the site server, the determined self-service terminals according to the predetermined optimization rule; and performing, by the site server, service operations between the self-service terminals following a service procedure of the lacked service according to the predetermined optimization rule.

5. The method according to claim 4, wherein according to the predetermined optimization rule, the service terminal among the service terminals which provides a largest number of resources and/or components is defined as a master terminal, and the rest of the service terminals is defined as a slave terminal, wherein the master terminal is given a priority in allocation of a service procedure associated with the lacked service, and the site server allocates the rest of the service procedure to the slave terminal.

6. A site server, comprising:

a service acquirement module configured to acquire self-service services corresponding to a self-service terminal in a self-service site;

a service detection module configured to detect whether the self-service services comprise a lacked service, and transmit a first trigger signal to a resource acquirement module in a case that the self-service services comprise a lacked service;

the resource acquirement module is configured to acquire resources and/or components of a self-service terminal required for the lacked service on reception of the first trigger signal from the service detection module;

a resource detection module configured to detect whether the self-service site possesses the resources and/or components of the self-service terminal required for the lacked service, and transmit a second trigger signal to a resource integration module in a case that the self-service site possesses the resources and/or components of the self-service terminal required for the lacked service;

the resource integration module configured to integrate the resources and/or components in the self-service site according to a predetermined integration rule on reception of the second trigger signal from the resource detection module; and a cooperation module configured to drive the integrated resources and/or components to cooperate with each other according to a predetermined optimization rule to enable the self-service site to provide a self-service service corresponding to the lacked service.

7. The site server according to claim 6, wherein the resource integration module comprises:

a terminal acquirement unit configured to select at least two self-service terminals in the self-service site according to the predetermined integration rule, wherein each of the at least two self-service terminals comprises the resources and/or components of the self-service terminal required for the lacked service; and a communication connection unit configured to establish a communication connection between the at least two self-service terminals.

8. The site server according to claim 6, wherein the resource integration module further comprises:

an integration rule unit configured to bear the predetermined integration rule, wherein the integration rule unit comprises a first integration rule sub-unit, a second integration rule sub-unit and a third integration rule sub-unit, a priority of the first integration rule sub-unit is higher than a priority of the second integration rule sub-unit, and a priority of the second integration rule sub-unit is higher than a priority of the third integration rule sub-unit, wherein the first integration rule sub-unit is configured to specify that an integration solution in which the resources and/or components are provided by less self-service terminals has a priority to be selected, wherein the number of the self-service terminals is at least 2;

the second integration rule sub-unit is configured to specify that an integration solution in which the resources and/or components are provided by idle self-service terminals has a priority to be selected;

the third integration rule sub-unit is configured to specify that an integration solution in which the resources and/or components are provided by self-service terminals which are located geographically close to each other has a priority to be selected.

9. The site server according to claim 6, wherein the cooperative operation module comprises:

a terminal determination unit configured to determine self-service terminals comprising the integrated resources and/or components;

an authentication unit configured to authenticate the determined self-service terminals according to a predetermined optimization rule; and a service operation unit configured to perform service operations between the self-service terminals following a service procedure of the lacked service according to the predetermined optimization rule.

10. The site server according to claim 9, wherein the cooperative operation module further comprises:

a optimization rule unit configured to carry the predetermined optimization rule, wherein according to the predetermined optimization rule, a service terminal among the service terminals which provides a largest number of resources and/or components is defined as a master terminal, and the rest of the several service terminal is defined as a slave terminal, wherein the master terminal is given a priority in allocation of a service procedure associated with the lacked service, and the service operation allocates the rest of the service procedure to the slave terminal.

* * * * *